United States Patent
Okazawa et al.

(10) Patent No.: US 9,039,192 B2
(45) Date of Patent: May 26, 2015

(54) PROJECTION DISPLAY DEVICE COMPRISING A LIGHT SOURCE

(75) Inventors: Shunsuke Okazawa, Tokyo (JP);
Takayuki Okada, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 410 days.

(21) Appl. No.: 13/508,979

(22) PCT Filed: Nov. 24, 2009

(86) PCT No.: PCT/JP2009/069764
§ 371 (c)(1),
(2), (4) Date: May 29, 2012

(87) PCT Pub. No.: WO2011/064832
PCT Pub. Date: Jun. 3, 2011

(65) Prior Publication Data
US 2012/0229710 A1    Sep. 13, 2012

(51) Int. Cl.
*G03B 21/16* (2006.01)
*H04N 5/74* (2006.01)
*H04N 9/31* (2006.01)
*G09G 3/34* (2006.01)

(52) U.S. Cl.
CPC .............. *G03B 21/16* (2013.01); *H04N 9/3155* (2013.01); *G09G 3/3406* (2013.01); *H04N 9/3144* (2013.01)

(58) Field of Classification Search
CPC ... G03B 21/16; H04N 9/3144; H04N 9/3155; G09G 3/3406

USPC .............. 353/57, 58, 60, 61; 348/748, E9.025
See application file for complete search history.

(56) References Cited

U.S. PATENT DOCUMENTS

| | | | |
|---|---|---|---|
| 6,007,205 | A | 12/1999 | Fujimori |
| 7,942,234 | B2 | 5/2011 | Utsunomiya |
| 8,127,886 | B2 | 3/2012 | Utsunomiya |
| 8,550,633 | B2 | 10/2013 | Utsunomiya |
| 2005/0030485 | A1 | 2/2005 | Oketani |
| 2005/0242741 | A1 | 11/2005 | Shiota et al. |

(Continued)

FOREIGN PATENT DOCUMENTS

| | | |
|---|---|---|
| CN | 2527753 Y | 12/2002 |
| CN | 1412646 A | 4/2003 |

(Continued)

OTHER PUBLICATIONS

Chinese Office Action dated Apr. 21, 2014, with English translation.

(Continued)

*Primary Examiner* — Toan Ton
*Assistant Examiner* — Magda Cruz
(74) *Attorney, Agent, or Firm* — McGinn IP Law Group, PLLC

(57) ABSTRACT

A projection display device projects light modulated based on a video signal. The projection display device includes a light source, a first fan for cooling the light source, and a second fan different from the first fan. The number of revolutions of the first fan is increased or decreased with the increase or decrease of the output of the light source. The number of revolutions of the second fan is decreased when the number of revolutions of the first fan is increased, and increased when the number of revolutions of the first fan is decreased.

16 Claims, 17 Drawing Sheets

(56) References Cited

U.S. PATENT DOCUMENTS

| | | | |
|---|---|---|---|
| 2006/0056023 A1* | 3/2006 | Malfait et al. | 359/472 |
| 2007/0285623 A1* | 12/2007 | Kuraie | 353/58 |
| 2009/0033879 A1 | 2/2009 | Saito | |
| 2009/0200001 A1* | 8/2009 | Tanaka | 165/121 |
| 2014/0036238 A1 | 2/2014 | Utsunomiya | |

FOREIGN PATENT DOCUMENTS

| | | |
|---|---|---|
| CN | 1570902 A | 1/2005 |
| CN | 101159133 A | 4/2008 |
| JP | 2000-352708 A | 12/2000 |
| JP | 2001-092015 A | 4/2001 |
| JP | 2002-182304 A | 6/2002 |
| JP | 2004-361462 A | 12/2004 |
| JP | WO2005/009035 A1 | 1/2005 |
| JP | 2005-121927 A | 5/2005 |
| JP | 2006-058804 A | 3/2006 |
| JP | 2006-084972 A | 3/2006 |
| JP | 2007-101897 A | 4/2007 |
| JP | 2007-256920 A | 10/2007 |
| JP | 2007-323082 A | 12/2007 |
| JP | 2009-036870 A | 2/2009 |
| JP | 4235769 B1 | 3/2009 |
| WO | WO96/30805 A1 | 10/1996 |

OTHER PUBLICATIONS

International Search Report in PCT/JP2009/069764 dated Dec. 22, 2009(English Translation Thereof).

* cited by examiner

Fig.6A

| Dimming Level | Lamp Output [W] | Number of Revolutions of Lamp Fan [rpm] | Number of Revolutions of Exhaust Fan [rpm] |
|---|---|---|---|
| L01 | 180 | 5400 | 2300 |
| L02 | 178 | 5310 | 2332 |
| L03 | 176 | 5220 | 2359 |
| L04 | 174 | 5130 | 2383 |
| L05 | 172 | 5040 | 2403 |
| L06 | 170 | 4950 | 2422 |
| L07 | 168 | 4860 | 2438 |
| L08 | 166 | 4770 | 2452 |
| L09 | 164 | 4680 | 2464 |
| L10 | 162 | 4590 | 2475 |
| L11 | 160 | 4500 | 2485 |

Fig.6B

| Dimming Level | Lamp Output [W] | Lamp Fan | | Exhaust Fan | | Device Noise [dB(A)] |
|---|---|---|---|---|---|---|
| | | Number of Revolutions [rpm] | Noise [dB(A)] | Number of Revolutions [rpm] | Noise [dB(A)] | |
| L01 | 180 | 5400 | 30.6 | 2300 | 31.1 | 33.8 |
| L02 | 178 | 5310 | 30.1 | 2332 | 31.4 | 33.8 |
| L03 | 176 | 5220 | 29.7 | 2359 | 31.7 | 33.8 |
| L04 | 174 | 5130 | 29.2 | 2383 | 32.0 | 33.8 |
| L05 | 172 | 5040 | 28.8 | 2403 | 32.2 | 33.8 |
| L06 | 170 | 4950 | 28.3 | 2422 | 32.4 | 33.8 |
| L07 | 168 | 4860 | 27.8 | 2438 | 32.6 | 33.8 |
| L08 | 166 | 4770 | 27.3 | 2452 | 32.7 | 33.8 |
| L09 | 164 | 4680 | 26.8 | 2464 | 32.9 | 33.8 |
| L10 | 162 | 4590 | 26.3 | 2475 | 33.0 | 33.8 |
| L11 | 160 | 4500 | 25.8 | 2485 | 33.1 | 33.8 |

Fig.11A

| Dimming Level | Lamp Output [W] | Number of Revolutions of Lamp Fan [rpm] | Number of Revolutions of Exhaust Fan [rpm] | Number of Revolutions of Power Source Fan [rpm] |
|---|---|---|---|---|
| L01 | 180 | 5400 | 2300 | 4800 |
| L02 | 178 | 5310 | 2300 | 4944 |
| L03 | 176 | 5220 | 2300 | 5060 |
| L04 | 174 | 5130 | 2300 | 5157 |
| L05 | 172 | 5040 | 2300 | 5237 |
| L06 | 170 | 4950 | 2300 | 5306 |
| L07 | 168 | 4860 | 2300 | 5365 |
| L08 | 166 | 4770 | 2300 | 5416 |
| L09 | 164 | 4680 | 2300 | 5461 |
| L10 | 162 | 4590 | 2300 | 5500 |
| L11 | 160 | 4500 | 2300 | 5534 |

Fig.11B

| Dimming Level | Lamp Output [W] | Lamp Fan | | Exhaust Fan | | Power Source Fan | | Device Noise [dB(A)] |
|---|---|---|---|---|---|---|---|---|
| | | Number of Revolutions [rpm] | Noise [dB(A)] | Number of Revolutions [rpm] | Noise [dB(A)] | Number of Revolutions [rpm] | Noise [dB(A)] | |
| L01 | 180 | 5400 | 30.6 | 2300 | 31.1 | 4800 | 27.5 | 34.7 |
| L02 | 178 | 5310 | 30.1 | 2300 | 31.1 | 4944 | 28.3 | 34.7 |
| L03 | 176 | 5220 | 29.7 | 2300 | 31.1 | 5060 | 28.9 | 34.7 |
| L04 | 174 | 5130 | 29.2 | 2300 | 31.1 | 5157 | 29.3 | 34.7 |
| L05 | 172 | 5040 | 28.8 | 2300 | 31.1 | 5237 | 29.8 | 34.7 |
| L06 | 170 | 4950 | 28.3 | 2300 | 31.1 | 5306 | 30.1 | 34.7 |
| L07 | 168 | 4860 | 27.8 | 2300 | 31.1 | 5365 | 30.4 | 34.7 |
| L08 | 166 | 4770 | 27.3 | 2300 | 31.1 | 5416 | 30.6 | 34.7 |
| L09 | 164 | 4680 | 26.8 | 2300 | 31.1 | 5461 | 30.8 | 34.7 |
| L10 | 162 | 4590 | 26.3 | 2300 | 31.1 | 5500 | 31.0 | 34.7 |
| L11 | 160 | 4500 | 25.8 | 2300 | 31.1 | 5534 | 31.2 | 34.7 |

Fig.15A

| Dimming Level | Lamp Output [W] | Number of Revolutions of Lamp Fan [rpm] | Number of Revolutions of Exhaust Fan [rpm] | Number of Revolutions of Power Source Fan [rpm] |
|---|---|---|---|---|
| L01 | 180 | 5400 | 2300 | 4800 |
| L02 | 178 | 5310 | 2322 | 4847 |
| L03 | 176 | 5220 | 2342 | 4887 |
| L04 | 174 | 5130 | 2359 | 4924 |
| L05 | 172 | 5040 | 2374 | 4956 |
| L06 | 170 | 4950 | 2387 | 4984 |
| L07 | 168 | 4860 | 2399 | 5009 |
| L08 | 166 | 4770 | 2410 | 5032 |
| L09 | 164 | 4680 | 2419 | 5052 |
| L10 | 162 | 4590 | 2428 | 5069 |
| L11 | 160 | 4500 | 2436 | 5084 |

Fig.15B

| Dimming Level | Lamp Output [W] | Lamp Fan | | Exhaust Fan | | Power Source Fan | | Device Noise [dB(A)] |
|---|---|---|---|---|---|---|---|---|
| | | Number of Revolutions [rpm] | Noise [dB(A)] | Number of Revolutions [rpm] | Noise [dB(A)] | Number of Revolutions [rpm] | Noise [dB(A)] | |
| L01 | 180 | 5400 | 30.6 | 2300 | 31.1 | 4800 | 27.5 | 34.7 |
| L02 | 178 | 5310 | 30.1 | 2322 | 31.3 | 4847 | 27.7 | 34.7 |
| L03 | 176 | 5220 | 29.7 | 2342 | 31.5 | 4887 | 28.0 | 34.7 |
| L04 | 174 | 5130 | 29.2 | 2359 | 31.7 | 4924 | 28.1 | 34.7 |
| L05 | 172 | 5040 | 28.8 | 2374 | 31.9 | 4956 | 28.3 | 34.7 |
| L06 | 170 | 4950 | 28.3 | 2387 | 32.0 | 4984 | 28.5 | 34.7 |
| L07 | 168 | 4860 | 27.8 | 2399 | 32.2 | 5009 | 28.6 | 34.7 |
| L08 | 166 | 4770 | 27.3 | 2410 | 32.3 | 5032 | 28.7 | 34.7 |
| L09 | 164 | 4680 | 26.8 | 2419 | 32.4 | 5052 | 28.8 | 34.7 |
| L10 | 162 | 4590 | 26.3 | 2428 | 32.5 | 5069 | 28.9 | 34.7 |
| L11 | 160 | 4500 | 25.8 | 2436 | 32.6 | 5084 | 29.0 | 34.7 |

PROJECTION DISPLAY DEVICE COMPRISING A LIGHT SOURCE

TECHNICAL FIELD

The present invention relates to a projection display device that includes a cooling fan for cooing a light source.

BACKGROUND ART

As the light source of the projection display device, a discharge lamp such as an ultra high pressure mercury lamp or a metal halide lamp is used. The temperature of the discharge lamp becomes very high during lighting. In particular, when the temperature of a luminous tube becomes equal to or more than a predetermined temperature, the life of the discharge lamp may be shortened or flickers may occur. Therefore, to maintain the temperature of the discharge lamp (luminous tube) within a predetermined range, the discharge lamp must be cooled.

One of the known discharge lamp cooling methods is an air-cooling method that uses a cooling fan. According to the general air-cooling method, the number of revolutions of the cooling fan is controlled according to the increase or decrease of the output of the discharge lamp. Specifically, the number of revolutions of the cooling fan is increased when the output of the discharge lamp increases, and decreased when the output of the discharger lamp decreases. Patent Literatures 1 and 2 disclose more specific cooling fan revolution-number control methods.

Patent Literature 1 describes a liquid crystal display device configured such that the power source of the light source and the number of revolutions of the fan are controlled based on the result detected by a temperature sensor or a light amount sensor. In this liquid crystal display device, the temperature or emission amount of the lamp is detected by the sensor, and fed back to a microcomputer. The microcomputer increases or decreases the number of revolutions of the fan based on the fed-back information.

Patent Literature 2 describes a projection display device configured such that power supplied to the cooling fan is increased when power supplied to the light source is increased, and reduced when the power supplied to the light source is reduced.

CITATION LIST

Patent Literature

Patent Literature 1: JP2000-352708A
Patent Literature 2: JP2005-121927A

SUMMARY OF INVENTION

Problems to be Solved by Invention

In the liquid crystal display device described in Patent Literature 1, the number of revolutions of the fan changes in response to a change in lamp emission amount. Thus, when a great change occurs in the lamp emission amount, the number of revolutions of the fan changes a lot per unit time, and noise that is offensive to a user's ears is generated. Even when a change in the amount of lamp emission is small, if the changing speed is fast, noise that is offensive to the user's ears is also generated.

Patent Literature 2 discloses the following two means for suppressing the generation of noise that is offensive to the ears. One is controlling power supplied to the cooling fan based on the average value of power supplied to the light source. The other is setting the upper limit of the amount of change in power which is supplied to the cooling fan within a predetermined time. However, according to the two means, the change of power supplied to the cooling fan lags behind the change of power supplied to the light source, and hence it is difficult to keep the temperature of the light source (lamp) constant.

In short, when the response speed of the change in the number of revolutions of the fan to a change in the lamp output is set faster in order to keep the lamp temperature constant, noise that is offensive to the ears is generated. On the other hand, when the response speed of the change in the number of revolutions of the fan to a change in the lamp output change is set slower in order to suppress the generation of noise, it is difficult to keep the lamp temperature constant.

Solution to Problems

The number of revolutions of a second fan is decreased when the number of revolutions of a first fan for cooling a light source is increased, and increased when the number of revolutions of the first fan is decreased. As a result, the decrease or increase of noise of the first fan and the decrease or increase of the second fan cancel each other to keep the noise of the entire device almost constant.

Effects of Invention

According to the present invention, even when the number of revolutions of the fan for cooling the light source is changed at high speed in response to the output change of the light source, the noise of the entire device is kept almost constant.

BRIEF DESCRIPTION OF DRAWINGS

FIG. 6A shows the example of a data table stored in a storage unit shown in FIG. 5, FIG. 6B shows the example of an interrelationship among a lamp output, the number of revolutions and the noise of a lamp fan, the number of revolutions and the noise of an exhaust fan, and device noise, FIG. 11A shows the example of a data table stored in a storage unit shown in FIG. 10, FIG. 11B shows the example of an interrelationship among a lamp output, the number of revolutions and the noise of a lamp fan, the number of revolutions and the noise of an exhaust fan, the number of revolutions and the noise of a power source fan, and device noise, FIG. 15A shows the example of the data table stored in the storage unit shown in FIG. 10, FIG. 15B shows the example of an interrelationship among the lamp output, the number of revolutions and the noise of the lamp fan, the number of revolutions and the noise of the exhaust fan, the number of revolutions and the noise of the power source fan, and the device noise.

DESCRIPTION OF EMBODIMENTS (First Embodiment)

Figure 1:
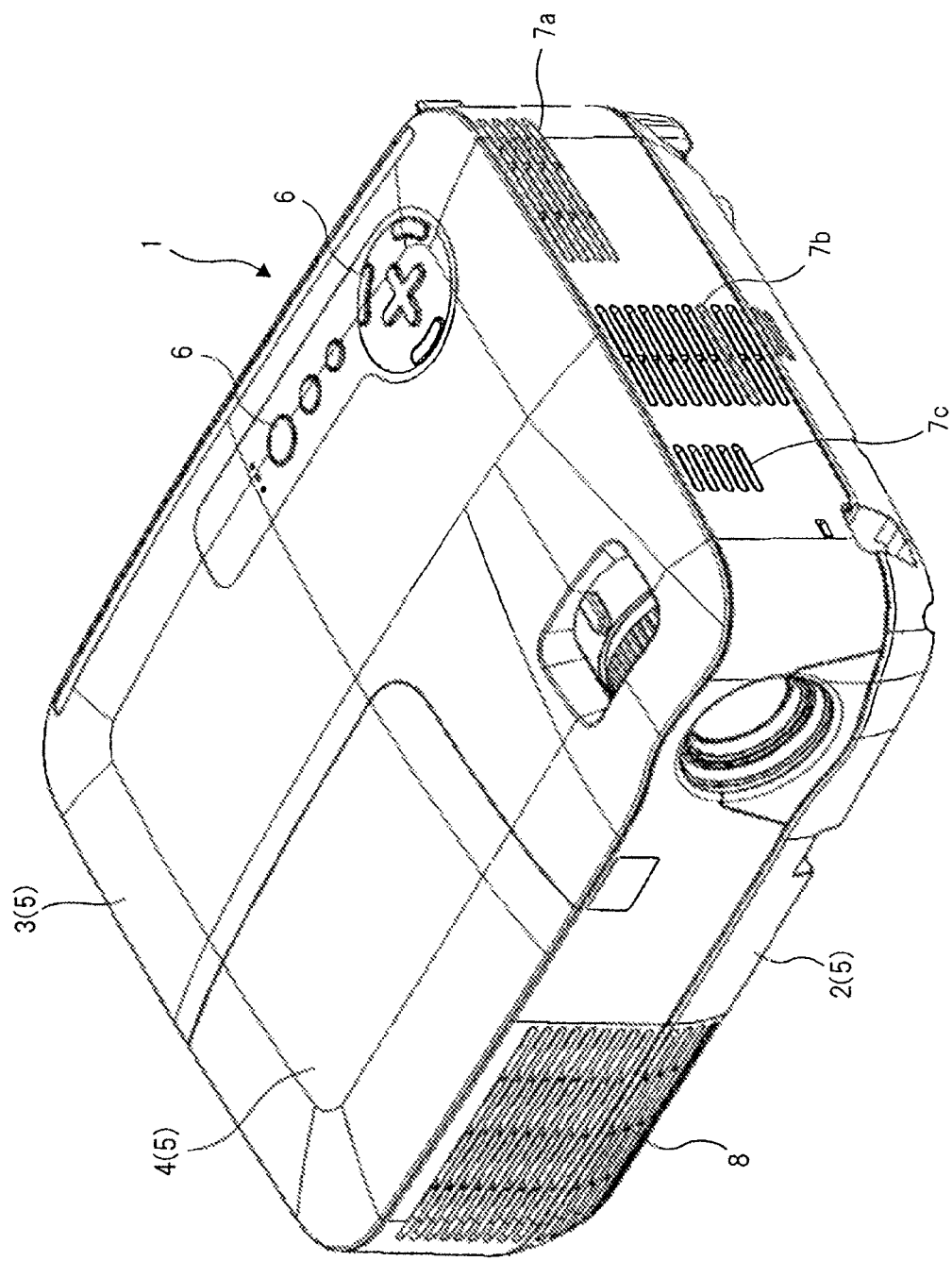
FIG. 1 is a perspective view showing a projection display device according to a first embodiment.

FIG. 1 is a perspective view showing the appearance of a projection display device according to the present invention. Projection display device 1 according to this embodiment has case 5 that includes bottom case 2, upper case 3, and lamp case 4. A plurality of control buttons 6 are formed on the surface of upper case 3. Three suction ports 7a to 7c are formed on the left surface of upper case 3 to introduce outside air into the case. Exhaust port 8 is formed on the front of upper case 3 to discharge air out of the case.

Figure 2:
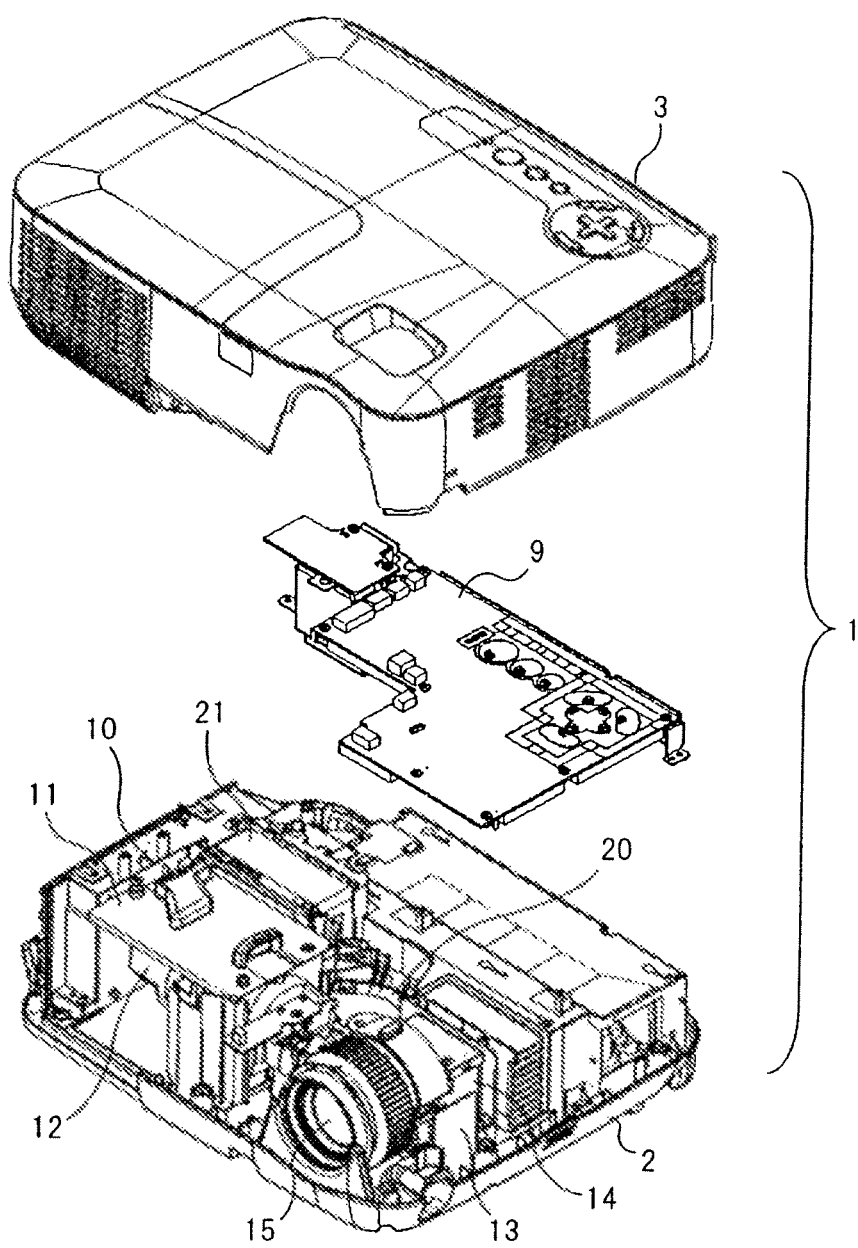
FIG. 2 is an exploded perspective view of the projection display shown in FIG. 1.

FIG. 2 is an exploded perspective view of projection display 1. FIG. 2 shows the removed state of upper case 3 and main substrate 9. A part of power supplied from the outside is supplied to lamp unit 11 via power source unit 10. The other part of the power supplied from the outside is supplied to main substrate 9 via power source unit 10. When a user presses a power source button, projection display device 1 is activated to light lamp 12 in lamp unit 11. Light emitted from lamp 12 is guided through optical engine 13 to DMD (Digital Micro-mirror Device) unit 14. The light guided to DMD unit 14 is applied to a DMD not shown via a plurality of optical components in DMD unit 14. The DMD modulates the incident light based on a video signal to generate image light. The generated image light is projected to a screen or the like not shown via projection lens 15.

In the abovementioned series of operations, the temperature of the electronic components or the optical components in case 5 is increased by self-heating or supplied heat. In particular, the temperature of the luminous tube of lamp 12 becomes very high. A fan (lamp fan 20) is therefore provided exclusively to cool lamp 12. To cool the electronic components or the optical components other than lamp 12, an axial fan (exhaust fan 21) not shown is located near the center of case 5. Exhaust fan 21 cools the electronic components or the optical components by discharging air (heat) out of case 5.

Figure 3:
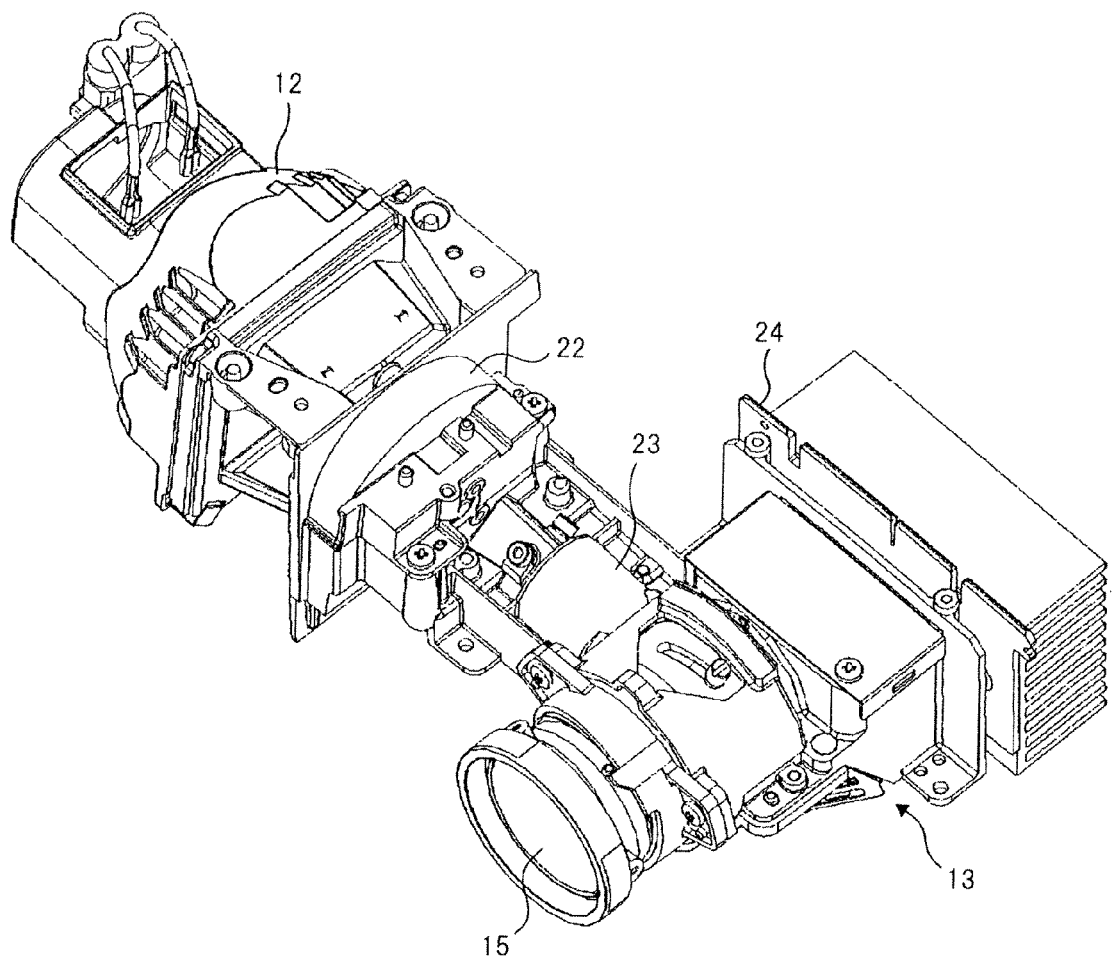
FIG. 3 is an enlarged perspective view of a lamp and an optical engine shown in FIG. 1.

FIG. 3 is an enlarged perspective view of lamp 12 and optical engine 13. The light emitted from lamp 12 passes through color wheel unit 22 that includes a color wheel which rotates by a motor. Light that passed through color wheel unit 22 passes through lens unit 23 that includes two condenser lenses. Light that passed through lens unit 23 is reflected by a mirror not shown. Light that is reflected by the mirror is applied to the DMD (not shown) mounted on DMD substrate 24 via a third condenser lens not shown. The DMD is driven based on the video signal output from main substrate 9 (shown in FIG. 2) to generate image light. The image light generated by the DMD is projected to the screen or the like via projection lens 15.

Figure 4:
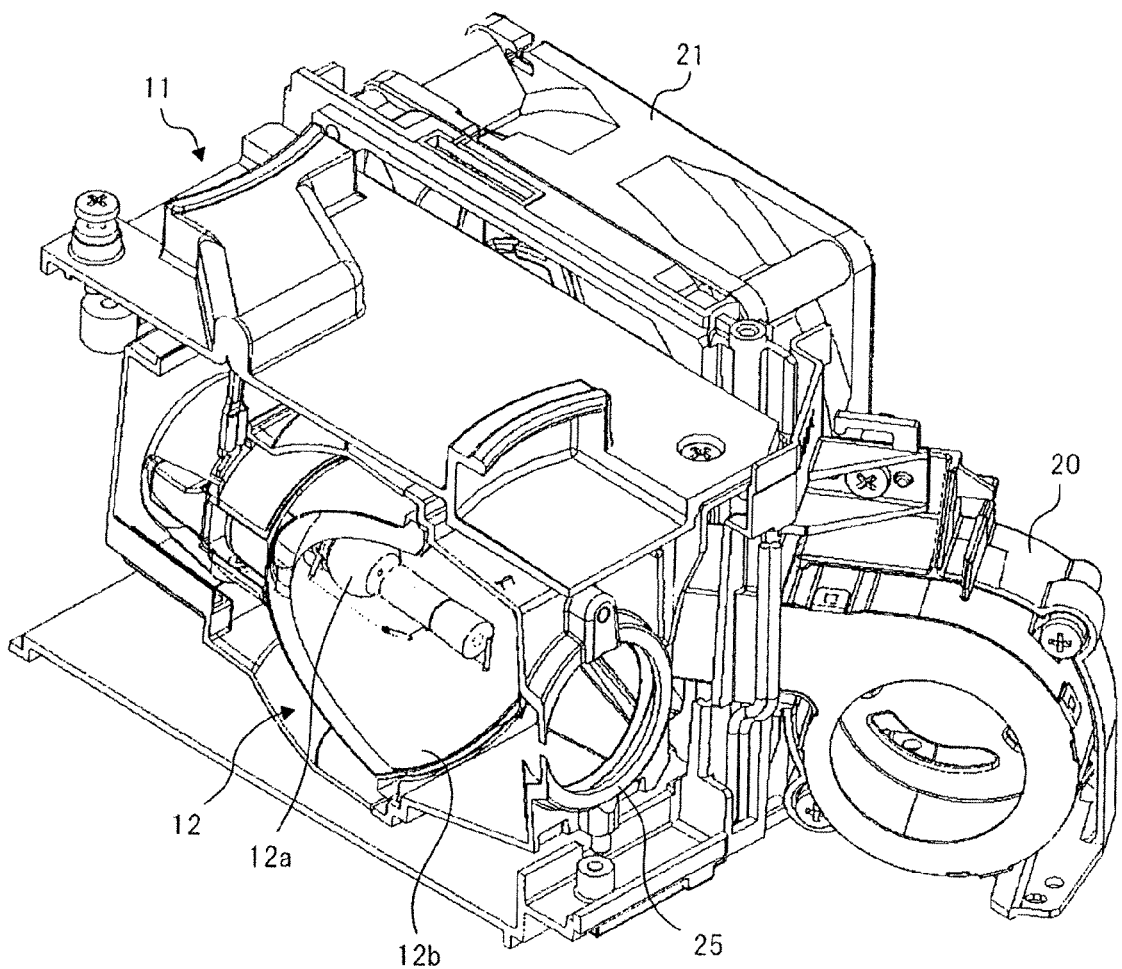
FIG. 4 is an enlarged perspective view of a lamp unit and its surroundings shown in FIG. 1.

FIG. 4 is an enlarged view showing lamp unit 11, lamp fan 20, and exhaust fan 21. In FIG. 4, to show luminous tube 12a of lamp 12, the front side of lamp unit 11 is cut off. Lamp 12 is a discharge lamp referred to as an ultrahigh pressure mercury lamp. Lamp 12 includes at least luminous tube 12a, a pair of opposing electrodes, and reflector 12b. One of the opposing electrodes is supported by reflector 12b. Light is emitted from a spherical part located at the center of luminous tube 12a, and the emitted light is reflected by reflector 12b. The light reflected by reflector 12b passes through cover glass 25 to enter optical engine 13 (shown in FIG. 3). In this case, the temperature of luminous tube 12a becomes very high, and hence luminous tube 12a is cooled by lamp fan 20. Specifically, cooling air is blown from lamp fan 20 located obliquely before lamp 12 to lamp 12. On the other hand, exhaust fan 21 is located behind reflector 12b. Exhaust fan 21 sucks air from lamp unit 11 to suppress a temperature increase in lamp unit 11. Exhaust fan 21 also serves to discharge not only air in lamp unit 11 but also air in case 5 (shown in FIG. 1) to the outside of case 5. However, since exhaust fan 21 is located behind reflector 12b, there is almost no change in temperature of luminous tube 12b even when the number of revolutions of exhaust fan 21 is increased or decreased.

Figure 5:
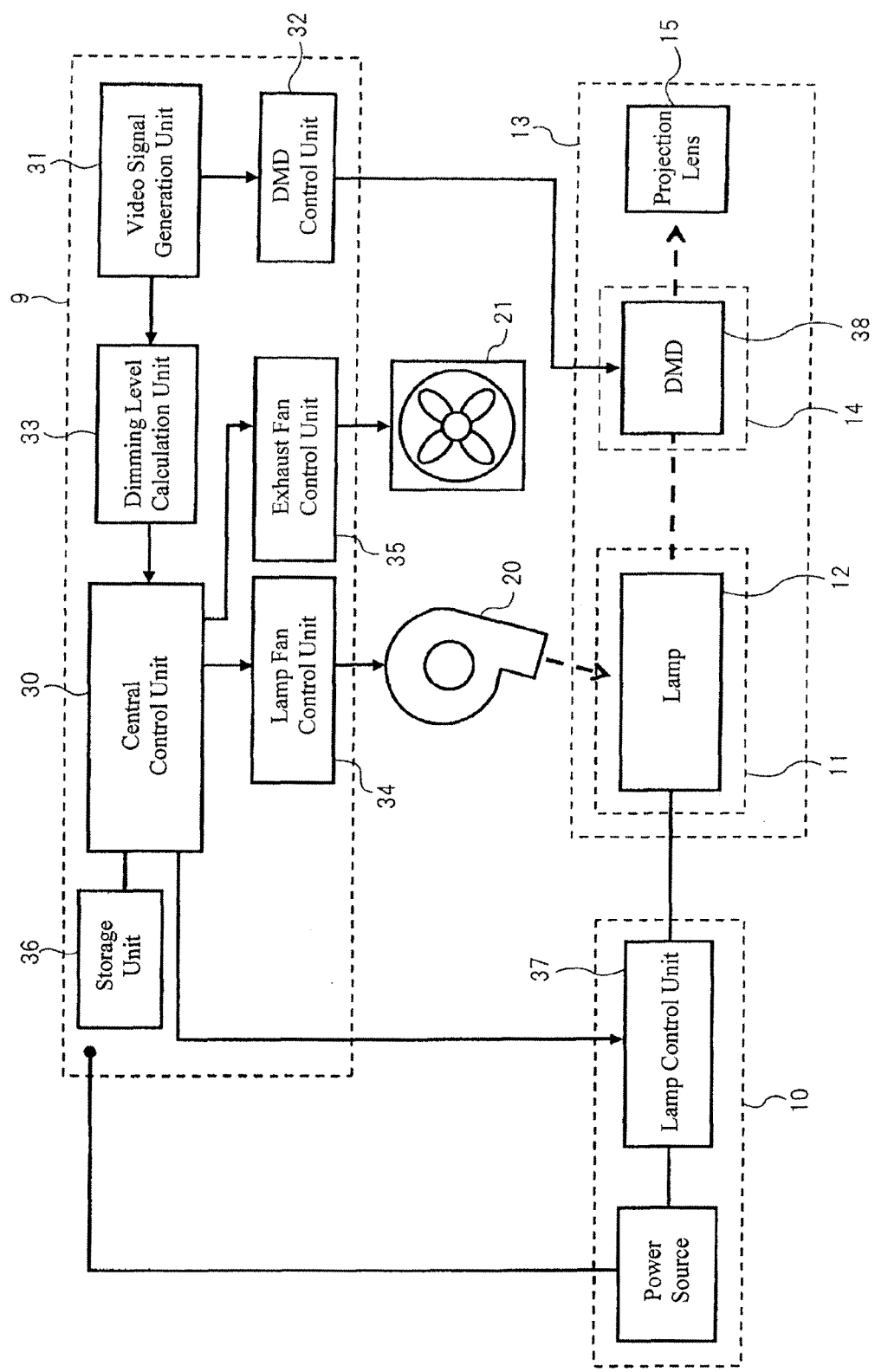
FIG. 5 is a control block diagram of the projection display device shown in FIG. 1.

FIG. 5 is a control block diagram showing projection display device 1. Main substrate 9 includes central control unit 30, video signal generation unit 31, DMD control unit 32, dimming level calculation unit 33, lamp fan control unit 34, exhaust fan control unit 35, and storage unit 36. Power source unit 10 includes lamp control unit 37.

DMD control unit 32 controls DMD 38 based on a video signal generated by video signal generation unit 31.

Dimming level calculation unit 33 calculates the dimming level by referring to the video signal generated by video signal generation unit 31. Central control unit 30 responsible for overall control of projection display device 1 controls at least lamp fan control unit 34, exhaust fan control unit 35, and lamp control unit 37 based on the dimming level calculated by the dimming level calculation unit 33.

Storage unit 36 stores a data table shown in FIG. 6A. Specifically, storage unit 36 stores the data table showing a lamp output, the number of revolutions of the lamp fan, and the number of revolutions of the exhaust fan corresponding to each of eleven-stage dimming levels (L01 to L11). Central control unit 30 refers to the data table based on the calculated dimming level, and outputs a command to each of lamp fan control unit 34, exhaust fan control unit 35, and lamp control unit 37 based on the result of referring to the data table. Each control unit controls a control target according to the input command. In other words, central control unit 30 and lamp control unit 37 constitute a light source control unit that controls the lamp output. Central control unit 30 and lamp fan control unit 34 constitute a first fan control unit that controls the number of revolutions of lamp fan 20. Further, central control unit 30 and exhaust fan control unit 35 constitute a second fan control unit that controls the number of revolutions of exhaust fan 21.

The control of each control unit is described by way of specific example. For example, when the calculated dimming level is L01, lamp control unit 37 controls a ballast power source (not shown) in power source unit 10 so that the lamp output can be 180 watts according to the command from central control unit 30. Lamp fan control unit 34 maintains the number of revolutions of lamp fan 20 at 5400 rpm according to the command from central control unit 30. Exhaust fan control unit 35 maintains the number of revolutions of exhaust fan 21 at 2300 rpm according to the command from central control unit 30.

When the calculated dimming level is L11, lamp control unit 37 controls the ballast power source so that the lamp output can be 160 watts according to the command from central control unit 30. Lamp fan control unit 34 maintains the number of revolutions of lamp fan 20 at 4500 rpm according to the command from central control unit 30. Exhaust fan control unit 35 maintains the number of revolutions of exhaust fan 21 at 2485 rpm according to the command from central control unit 30.

FIG. 6B shows a lamp output for each dimming level, the number of revolutions and the noise of lamp fan 20, the number of revolutions and the noise of exhaust fan 21, and the noise of the entire device (device noise). The device noise is measured at a position of 1 meter behind the device. As described above, the lamp output, the number of revolutions of lamp fan 20, and the number of revolutions of exhaust fan 21 change depending on the dimming levels. However, the device noise is kept constant.

Figure 7:
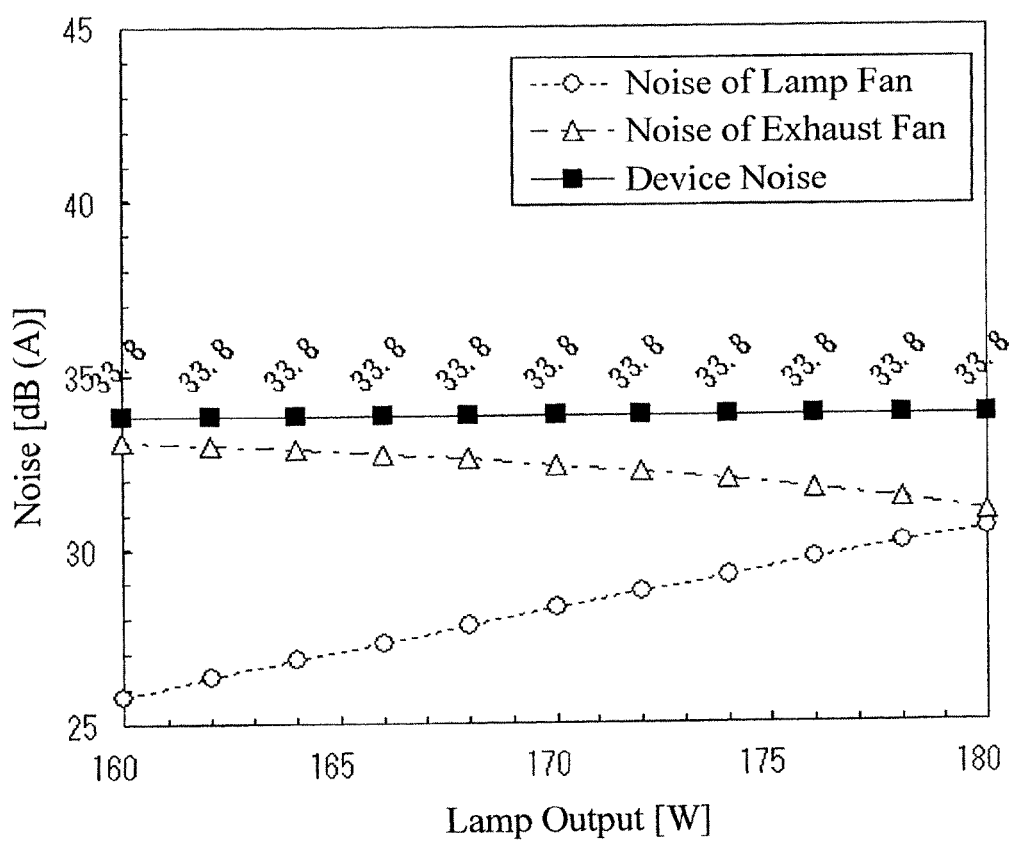
FIG. 7 shows the example of a relationship between the noise of each fan and the device noise with respect to the lamp output.

FIG. 7 is a graph that shows the relationship of the noise of each fan and the device noise to the lamp output. The number of revolutions of lamp fan 20 shown in FIG. 5 increases with the increase of the lamp output (shown in FIGS. 6A and 6B). Thus, when the lamp output increases, the noise of lamp fan 20 also increases. On the other hand, the number of revolutions of exhaust fan 21 shown in FIG. 5 decreases with the increase of the lamp output (shown in FIGS. 6A and 6B). Thus, when the lamp output increases, the noise of exhaust fan 21 decreases. As a result, the device noise is kept constant (33.8 dB(A)) even when the lamp output increases or decreases. In other words, the noise increase of lamp fan 20 and the noise decrease of exhaust fan 21 cancel each other. Thus, to keep the temperature of lamp 12 (luminous tube 12a shown in FIG. 4) constant, even when the number of revolutions of lamp fan 20 is increased with the increase of the lamp output, the device noise is kept constant. As described above, the temperature of lamp 12 (luminous tube 12a) is hardly influenced by the increase or decrease of the number of revolutions of exhaust fan 21. Therefore, even when the number of revolutions of exhaust fan 21 is decreased with the increase of the lamp output, the temperature of lamp 12 (luminous tube 12a) is kept almost constant.

Figure 8:
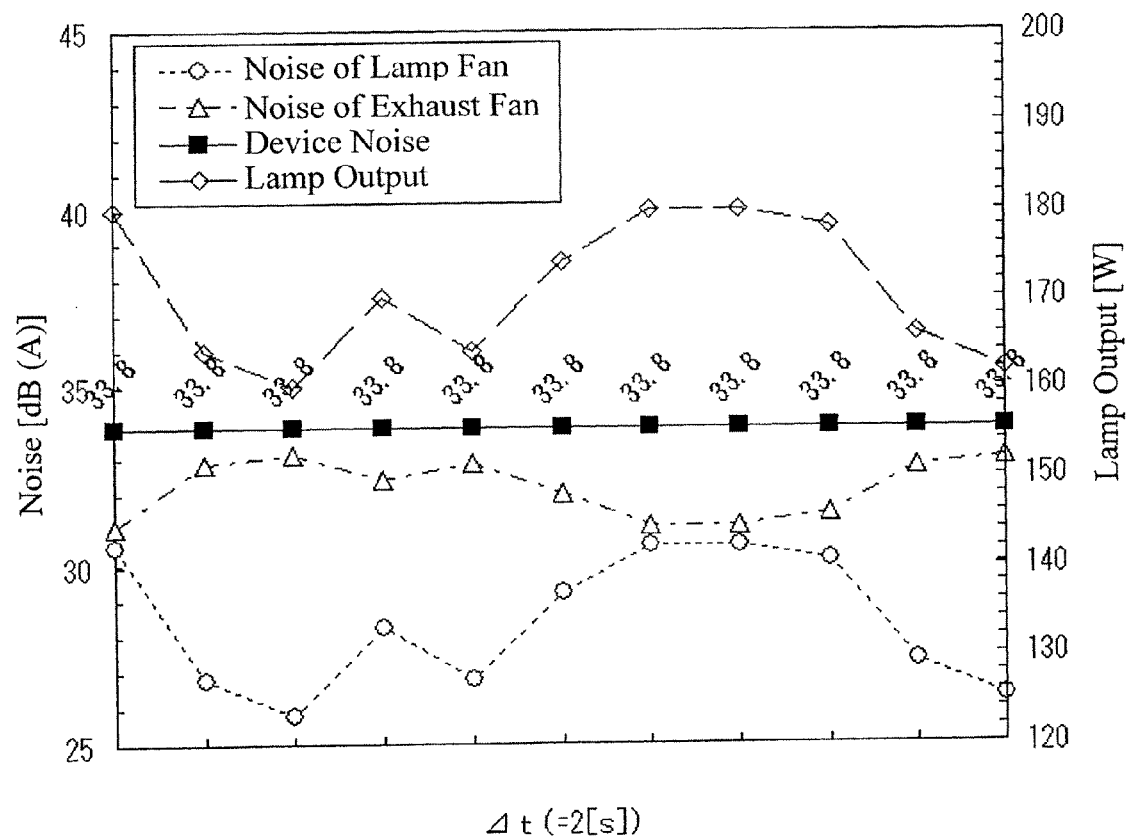
FIG. 8 shows the example of a relationship between the noise of each fan and the device noise with respect to the change of the lamp output during a dimming operation.

FIG. 8 is a graph that shows the noise of each fan and the device noise with respect to the change of the lamp output during a dimming operation. The horizontal axis of the graph indicates elapsed time, the dimming levels being updated every two seconds. The number of revolutions of lamp fan 20 (shown in FIG. 5) increases or decreases with the increase or decrease of the lamp output, and the number of revolutions of exhaust fan 21 (shown in FIG. 5) decreases or increases. In other words, the number of revolutions of exhaust fan 21 decreases when the number of revolutions of lamp fan 20 increases, and increases when the number of revolutions of lamp fan 20 decreases, thereby keeping the device noise constant.

Figure 9:
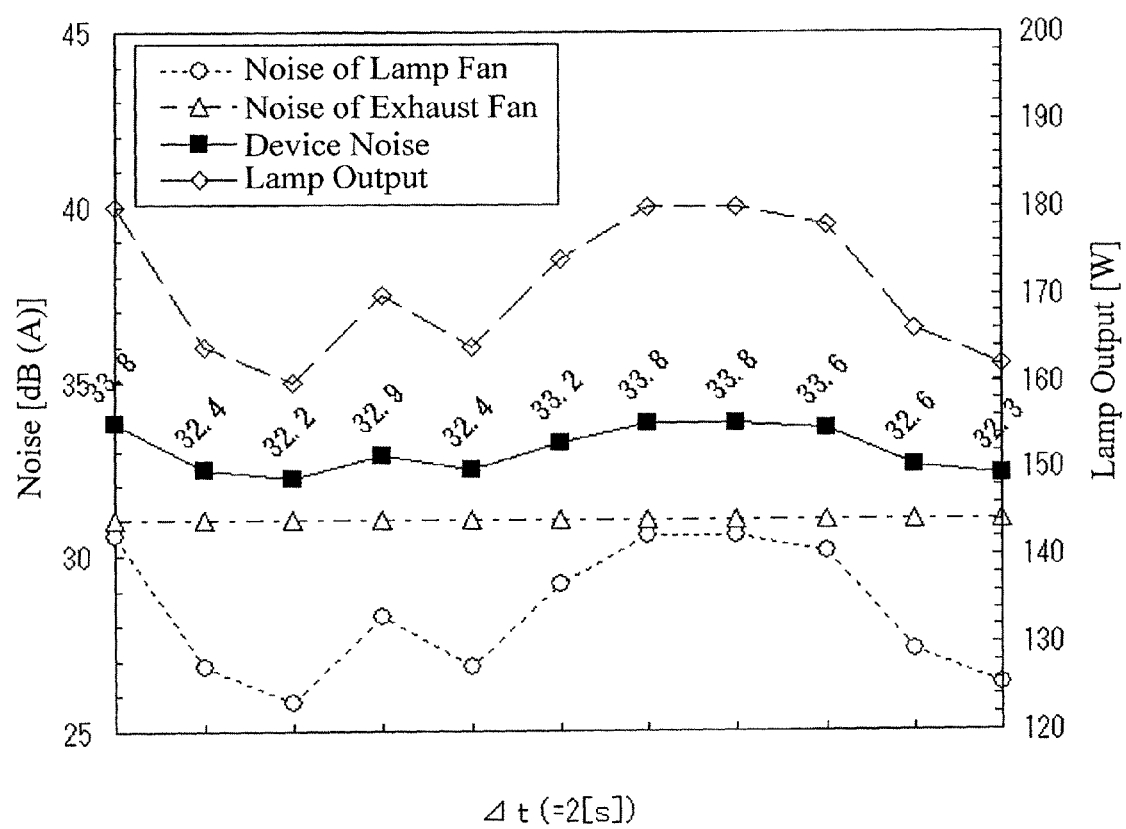
FIG. 9 shows the example of the result of using a conventional fan control method.

FIG. 9 is a graph that shows the result of conventional fan control. When dimming operations are carried out at every two seconds under the conventional fan control, the device noise changes by 1.4 dB at maximum. On the other hand, under the fan control of the present invention, the device noise is kept constant. Further, even when the execution interval of the dimming operations is set shorter, the device noise is kept constant. The number of revolutions of the fans is subject to feedback control. Specifically, a voltage applied to the fan is changed based on a pulse signal returned from the fan. Lamp fan 20 and exhaust fan 21 shown in FIG. 4 or the like are different in shape and size, and hence the responsiveness of a change in the number of revolutions of the fan to the applied voltage varies. Thus, the execution interval of the dimming operations cannot be indefinitely set shorter. However, in projection display device 1 according to this embodiment, the device noise is kept almost constant even when the execution interval of the dimming operations is set to be about 1.5 seconds.

(Second Embodiment)

The basic configuration of a projection display device according to this embodiment is similar to that of the projection display device according to the first embodiment. The projection display device according to this embodiment includes a second sirocco fan (power source fan) for cooling a power source unit. The power source fan is a sirocco fan similar in shape and size to lamp fan 20.

Figure 10:
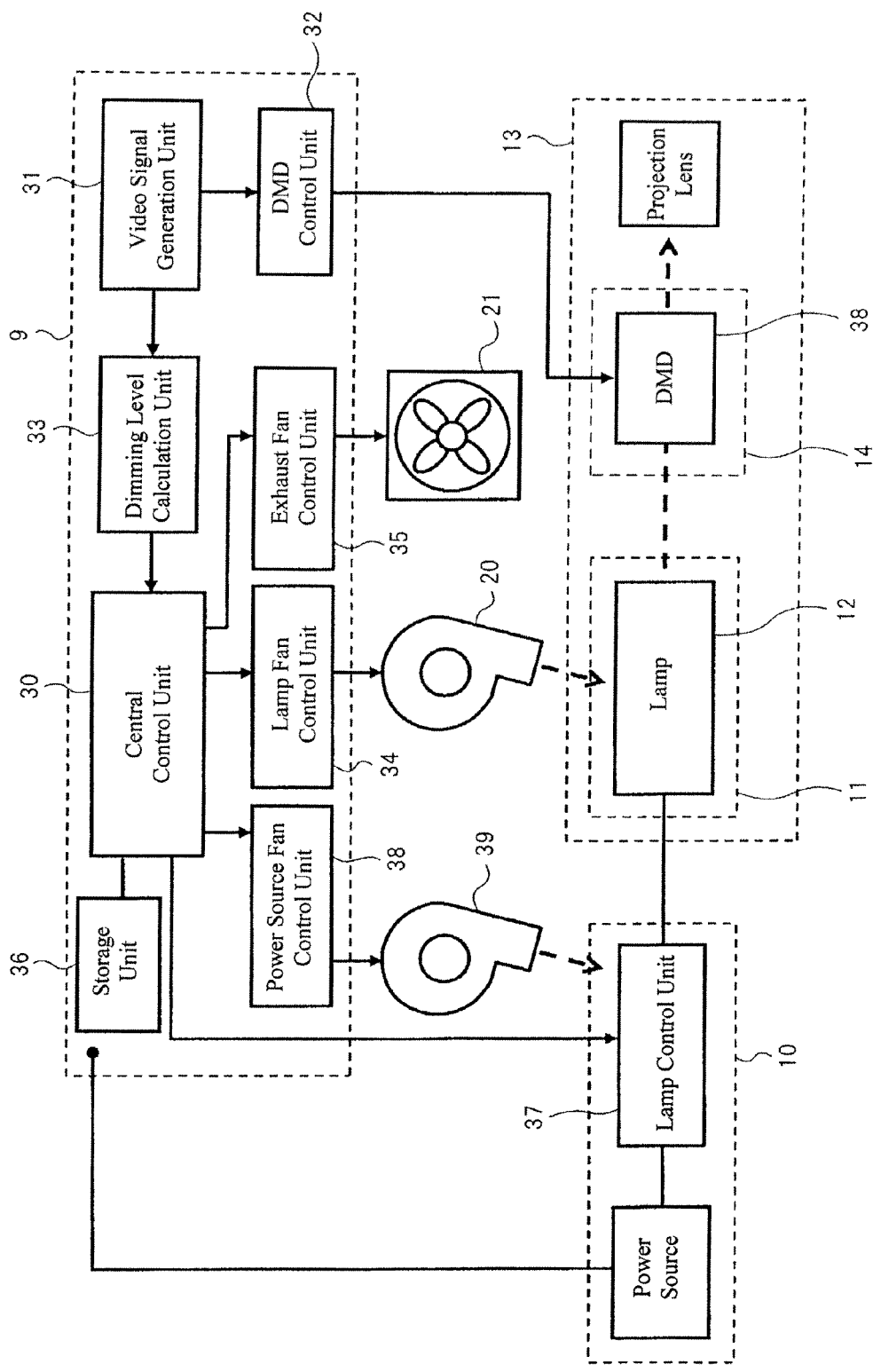
FIG. 10 is a control block diagram showing a projection display device according to a second embodiment.

FIG. 10 is a control block diagram showing the projection display device according to this embodiment. Shown main substrate 9, power unit 10, and optical engine 13 are substantially similar to those of identical names shown in FIG. 5. Central control unit 30, video signal generation unit 31, DMD control unit 32, dimming level calculation unit 33, lamp fan control unit 34, exhaust fan control unit 35, storage unit 36, and lamp control unit 37 shown in FIG. 10 are substantially similar to those of identical names shown in FIG. 5. Further, lamp fan 20 and exhaust fan 21 shown in FIG. 10 are similar to lamp fan 20 and exhaust fan 21 shown in FIG. 5.

However, the projection display device according to this embodiment includes power source fan control unit 38 located on main substrate 9, and power source face 39 controlled by power source fan control unit 38. Power source fan control unit 38 controls the number of revolutions of power source fan 39 according to a command output from central control unit 30. In other words, central control unit 30 and power source fan control unit 38 constitute a third fan control unit that controls the number of revolutions of power source fan 39.

Storage unit 36 shown in FIG. 10 stores the data table shown in FIG. 11A. Specifically, storage unit 36 stores the data table showing a lamp output, the number of revolutions of the lamp fan, the number of revolutions of the exhaust fan, and the number of revolutions of the power source fan corresponding to each of eleven-stage dimming levels (L01 to L11). Central control unit 30 refers to the data table based on the calculated dimming level, and outputs a command to each of lamp fan control unit 34, exhaust fan control unit 35, power fan control unit 38, and lamp control unit 37 based on the result of referring to the data table. Each control unit controls a control target according to the input command.

The method for controlling each control unit is described by way of specific example. For example, when the calculated dimming level is L01, lamp control unit 37 controls the ballast power source (not shown) in power source unit 10 so that the lamp output can be 180 watts according to the command from central control unit 30. Lamp fan control unit 34 maintains the number of revolutions of lamp fan 20 at 5400 rpm according to the command from central control unit 30. Exhaust fan control unit 35 maintains the number of revolutions of exhaust fan 21 at 2300 rpm according to the command from central control unit 30. Power source fan control unit 38 maintains the number of revolutions of power source fan 39 at 4800 rpm according to the command from central control unit 30.

When the calculated dimming level is L11, lamp control unit 37 controls the ballast power source so that the lamp output can be 160 watts according to the command from central control unit 30. Lamp fan control unit 34 maintains the number of revolutions of lamp fan 20 at 4500 rpm according to the command from central control unit 30. Exhaust fan control unit 35 maintains the number of revolutions of exhaust fan 21 at 2485 rpm according to the command from central control unit 30. Power source fan control unit 38 maintains the number of revolutions of power source fan 39 at 5534 rpm according to the command from central control unit 30.

FIG. 11B shows the lamp output for each dimming level, the number of revolutions and the noise of lamp fan 20, the number of revolutions and the noise of exhaust fan 21, the number of revolutions and the noise of power source fan 39, and the noise of the entire device (device noise). The device noise is measured at a position of 1 meter behind the device. As described above, the lamp output, the number of revolutions of lamp fan 20, and the number of revolutions of power source fan 39 change depending on the dimming levels. However, the number of revolutions of exhaust fan 21 and the device noise are kept constant.

Figure 12:
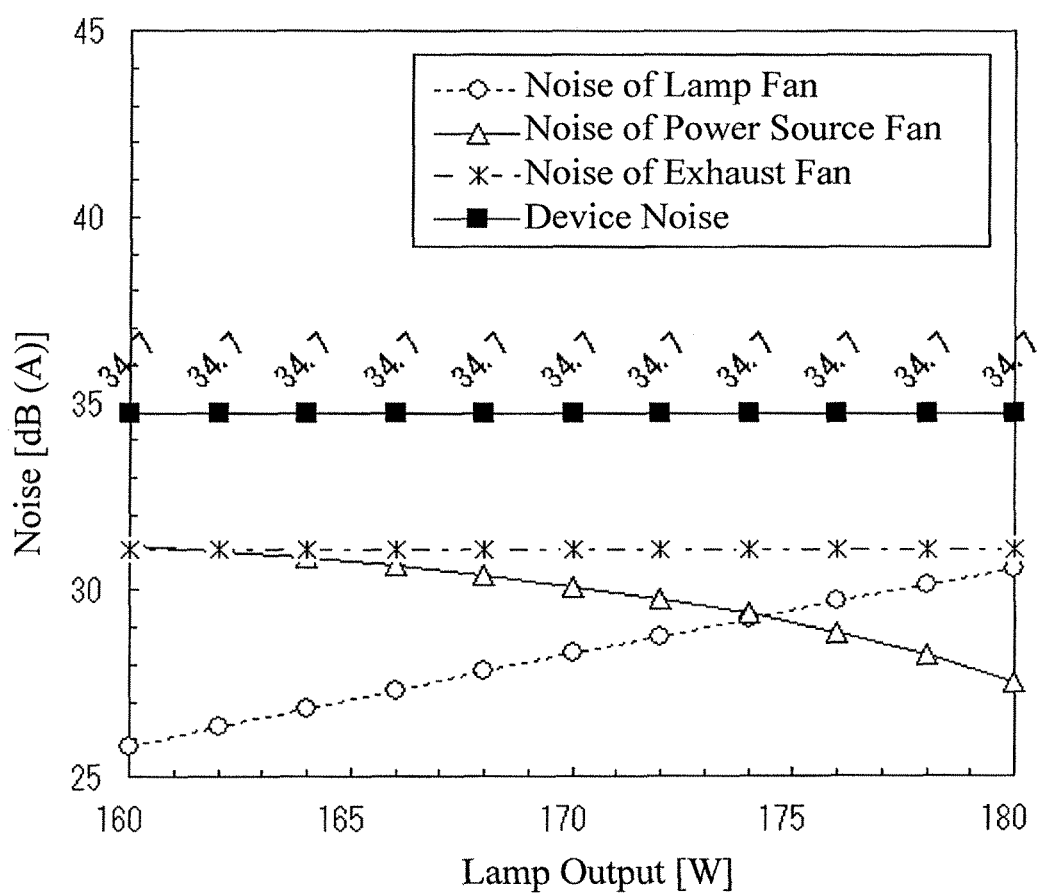
FIG. 12 shows the example of a relationship between the noise of each fan and the device noise with respect to the lamp output.

FIG. 12 is a graph that shows the relationship of the noise of each fan and the device noise to the lamp output. The number of revolutions of lamp fan 20 shown in FIG. 10 increases with the increase of the lamp output (shown in FIGS. 11A and 11B). Thus, when the lamp output increases, the noise of lamp fan 20 also increases. On the other hand, the number of revolutions of power source fan 39 shown in FIG. 10 decreases with the increase of the lamp output (shown in FIGS. 11A and 11B). Thus, when the lamp output increases, the noise of power source fan 39 decreases. The number of revolutions of exhaust fan 21 is kept constant even when the lamp output increases or decreases. As a result, the device noise is kept constant (34.7 dB(A)) even when the lamp output increases or decreases. In other words, the noise increase of lamp fan 20 and the noise decrease of power source fan 39 cancel each other. Thus, to keep the temperature of lamp 12 (luminous tube 12*a* shown in FIG. 4) constant, even when the number of revolutions of lamp fan 20 increases with the increase of the lamp output, the device noise is kept constant.

Figure 13:
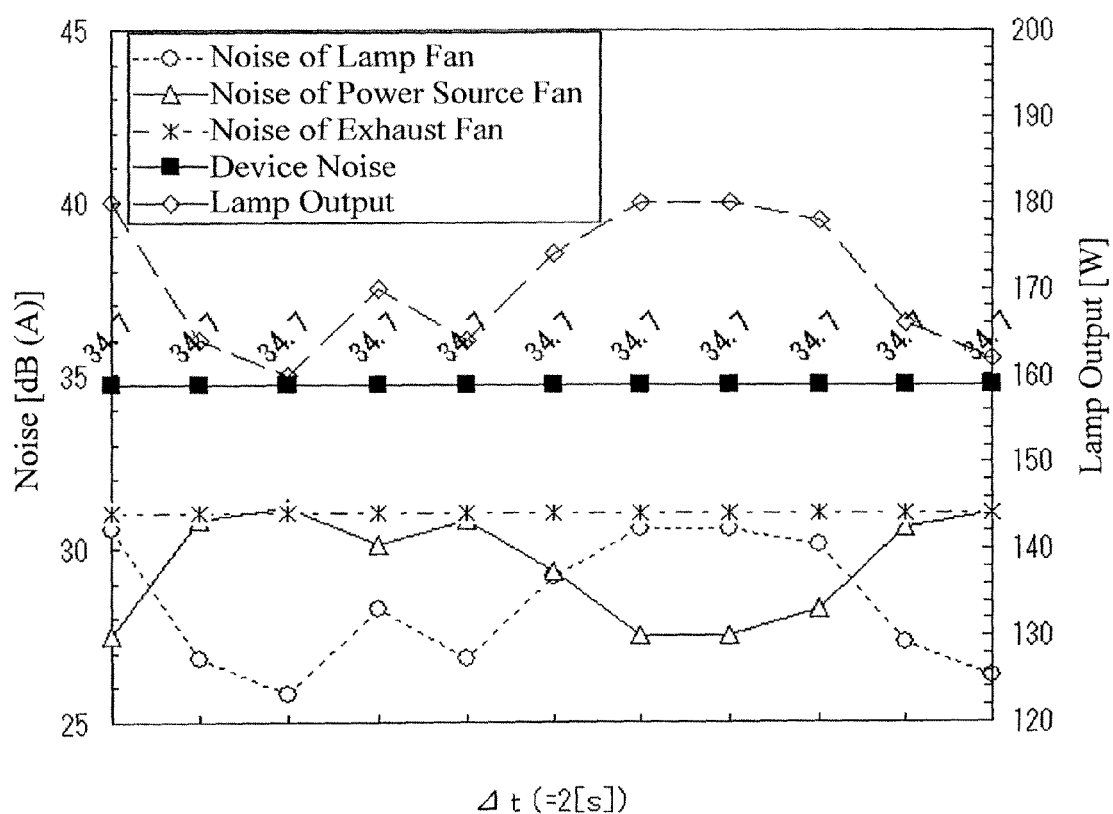
FIG. 13 shows the example of a relationship between the noise of each fan and the device noise with respect to the change of the lamp output during a dimming operation.

FIG. 13 is a graph that shows the noise of each fan and the device noise with respect to the change of the lamp output during a dimming operation. The horizontal axis of the graph indicates elapsed time, the dimming levels being updated every two seconds. The number of revolutions of lamp fan 20 (shown in FIG. 10) increases or decreases with the increase or decrease of the lamp output, and the number of revolutions of power source fan 39 (shown in FIG. 10) decreases or increases. In other words, the number of revolutions of power source fan 39 decreases when the number of revolutions of lamp fan 20 increases, and increases when the number of revolutions of lamp fan 20 decreases, thereby keeping the device noise constant.

Figure 14:
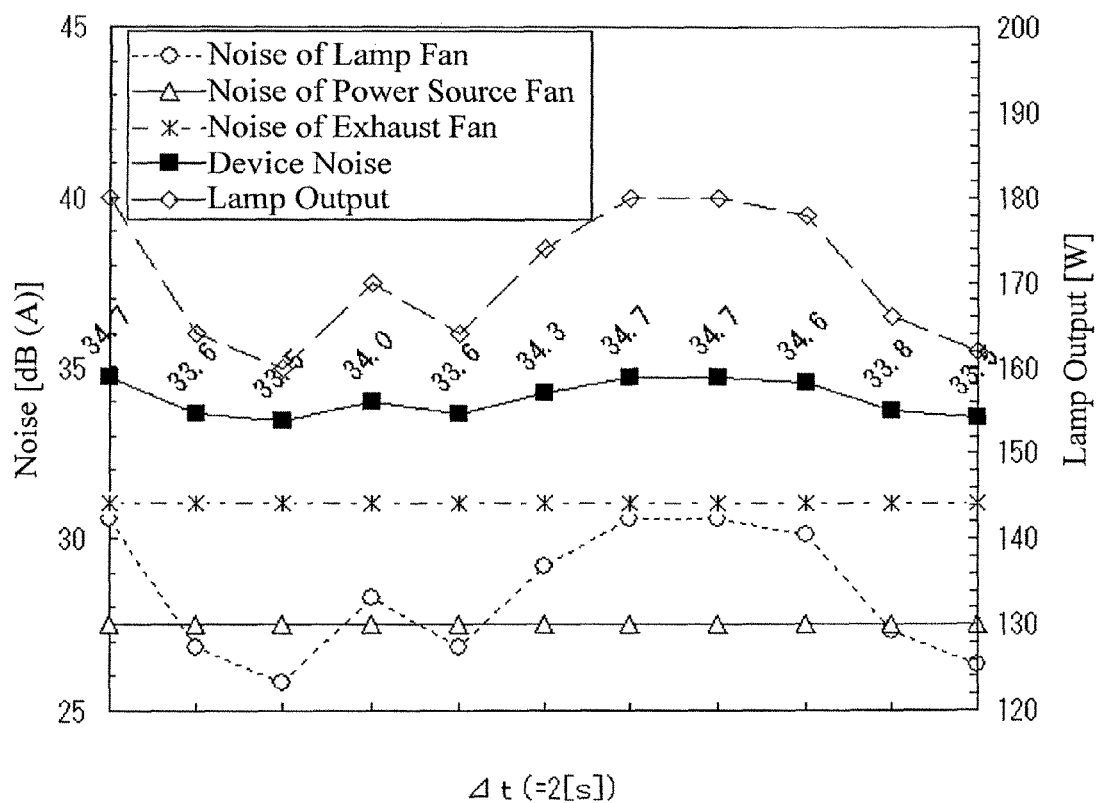
FIG. 14 shows the example of the result of using a conventional fan control method.

FIG. 14 is a graph that shows the result of using a conventional fan control method. When dimming operations are carried out every two seconds by using a conventional fan control method, the device noise changes by 1.1 dB at maximum. On the other hand, as described above, by using the fan control method of the present invention, the device noise is kept constant.

Further, according to this embodiment, the noise of lamp fan 20 is canceled by power source fan 39 that is similar in shape and size to lamp fan 20. In other words, the noise of lamp fan 20 and the noise of power source fan 39 are similar in sound quality. The responsiveness of lamp fan 20 and power source fan 39 to the change in the number of fan revolutions is similar. Thus, the noise of lamp fan 20 is canceled more effectively. As a result, even when the execution interval of the dimming operations is set shorter, the device noise can be kept constant. Specifically, in the projection display device of this embodiment, even when the execution interval of the dimming operations is set to be about 1.0 second, the device noise is kept almost constant.

In this embodiment, the number of revolutions of power source fan 39 shown in FIG. 10 is increased or decreased according to the increase or decrease of the lamp output. However, the number of revolutions of both power source fan 39 and exhaust fan 21 can be increased or decreased.

FIG. 15A shows a data table stored in storage unit 36 shown in FIG. 10 when the number of revolutions of both power source fan 39 and exhaust fan 21 are increased or decreased.

Central control unit 30 shown in FIG. 10 refers to the data table shown in FIG. 15A based on a calculated dimming level, and outputs a command to lamp fan control unit 34, exhaust fan control unit 35, power source fan 39, and lamp control unit 37 based on the result of referring to the data table. Each control unit controls a control target according to the input command.

For example, when the calculated dimming level is L01, lamp control unit 37 controls the ballast power source (not shown) in power source unit 10 so that the lamp output can be 180 watts according to the command from central control unit 30. Lamp fan control unit 34 maintains the number of revolutions of lamp fan 20 at 5400 rpm according to the command from central control unit 30. Exhaust fan control unit 35 maintains the number of revolutions of exhaust fan 21 at 2300 rpm according to the command from central control unit 30. Power source control unit 38 maintains the number of revolutions of power source fan 39 at 4800 rpm according to the command from central control unit 30.

When the calculated dimming level is L11, lamp control unit 37 controls the ballast power source so that the lamp output can be 160 watts according to the command from central control unit 30. Lamp fan control unit 34 maintains the number of revolutions of lamp fan 20 at 4500 rpm according to the command from central control unit 30. Exhaust fan control unit 35 maintains the number of revolutions of exhaust fan 21 at 2436 rpm according to the command from central control unit 30. Power source fan control unit 38 maintains the number of revolutions of power source fan 39 at 5084 rpm according to the command from central control unit 30.

FIG. 15B shows the lamp output for each dimming level, the number of revolutions and the noise of lamp fan 20, the number of revolutions and the noise of exhaust fan 21, the number of revolutions and the noise of power source fan 39, and the noise of the entire device (device noise). The device noise is measured at a position of 1 meter behind the device. As described above, the lamp output and the number of revolutions of fans 20, 21, and 39 changes depending on the dimming levels. However, the device noise is kept constant 34.7 dB(A)).

Figure 16:
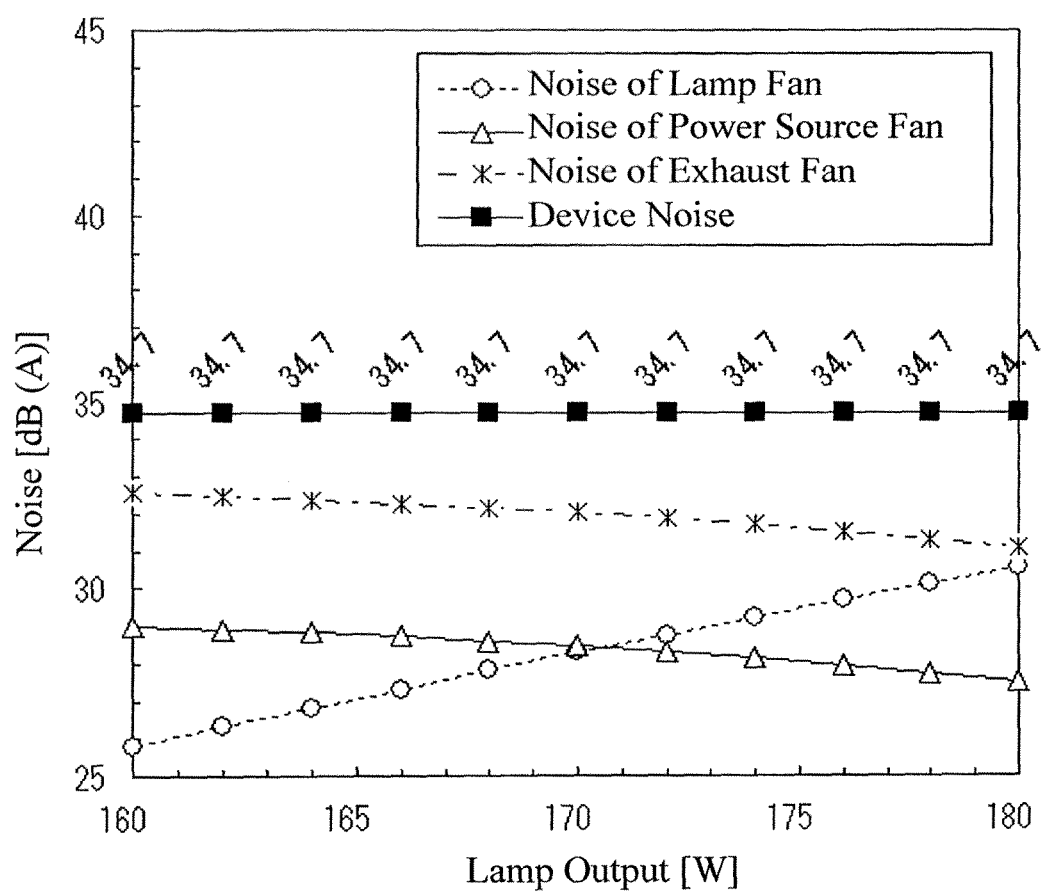
FIG. 16 shows the example of a relationship between the noise of each fan and the device noise with respect to the lamp output.

FIG. 16 is a graph that shows the relationship of the noise of each fan and the device noise to the lamp output. The number of revolutions of lamp fan 20 shown in FIG. 10 increases with the increase of the lamp output (shown in FIGS. 15A and 15B). Thus, when the lamp output increases, the noise of lamp fan 20 also increases. On the other hand, the number of revolutions of power source fan 39 and exhaust fan 21 shown in FIG. 10 decreases with the increase of the lamp output (shown in FIGS. 15A and 15B). Thus, when the lamp output increases, the noises of power source fan 39 and exhaust fan 21 decrease. As a result, the device noise is kept constant even when the lamp output increases or decreases. In other words, the noise increase of lamp fan 20 and the noise decreases of power source fan 39 and exhaust fan 21 cancel each other. Thus, to keep the temperature of lamp 12 (luminous tube 12a shown in FIG. 4) constant, even when the number of revolutions of lamp fan 20 is increased with the increase of the lamp output, the device noise is kept constant.

Figure 17:
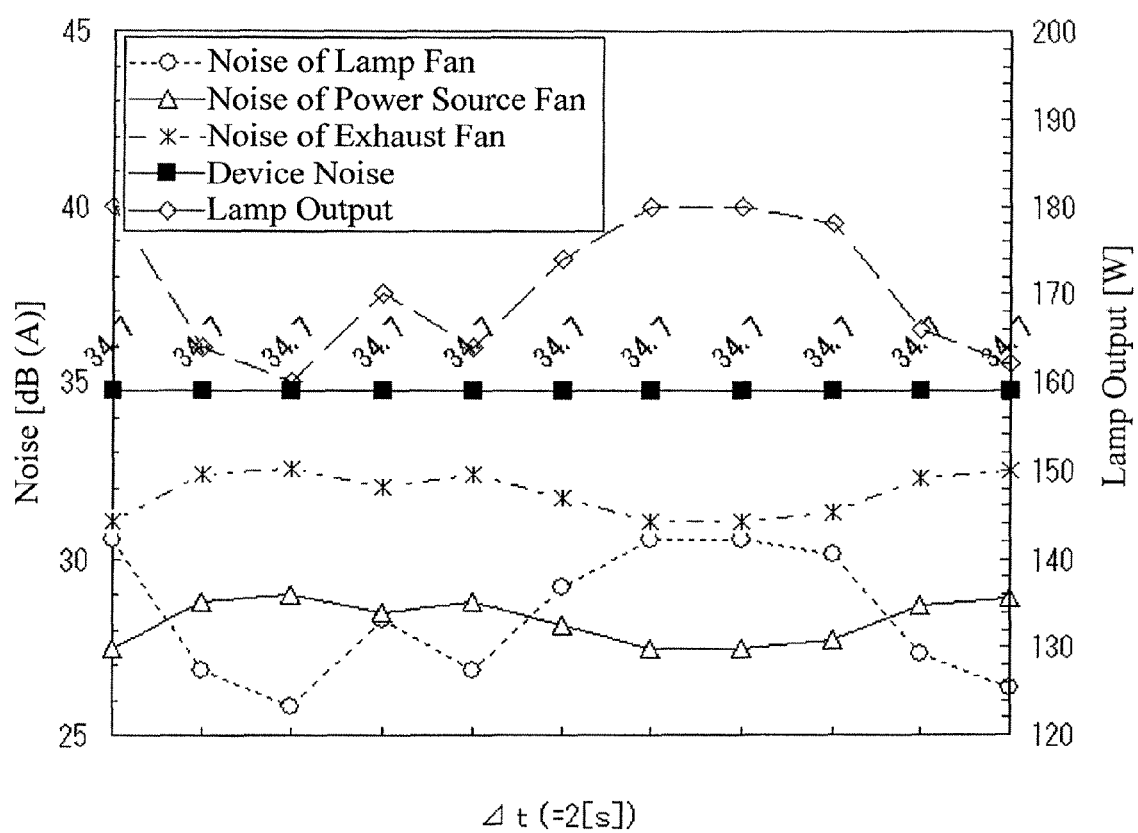
FIG. 17 shows the example of a relationship between the noise of each fan and the device noise with respect to the change of the lamp output during the dimming operation.

FIG. 17 that is a graph shows the noise of each fan and the device noise with respect to the change of the lamp output during a dimming operation. The horizontal axis of the graph indicates elapsed time, the dimming levels being updated every two seconds. The number of revolutions of lamp fan 20 (shown in FIG. 10) increases or decreases with the increase or decrease of the lamp output, and the number of revolutions of power source fan 39 and exhaust fan 21 (shown in FIG. 10) decrease or increase. In other words, the number of revolutions of power source fan 39 and exhaust fan 21 decreases when the number of revolutions of lamp fan 20 increases, and increases when the number of evolutions of lamp fan 20 decreases, thereby keeping the device noise constant.

As described above, when the number of revolutions of power source fan 39 and exhaust fan 21 is simultaneously increased or decreased, each change in the number of fan revolutions becomes small. As a result, even when the execution interval of the dimming operations is shortened to about 0.5 second, the device noise is kept almost constant.

The embodiment where the number of revolutions of at least one fan from among the exhaust fan and the power source fan is increased or decreased with the increase or decrease of the number of revolutions of the lamp fan has been described. However, when a fan is provided in addition to the exhaust fan and the power source fan, the number of revolutions of this fan can be increased or decreased with the increase or decrease of the number of revolutions of the lamp fan.

EXPLANATION OF REFERENCE NUMERALS

1: Projection display device
9: Main substrate
10: Power source unit
11: Lamp unit
12: Lamp
12a: Luminous tube
13: Optical engine
14: DMD unit
20: Lamp fan
21: Exhaust fan
30: Central control unit
31: Video signal generation unit
32: DMD control unit
33: Dimming level calculation unit
34: Lamp fan control unit
35: Exhaust fan control unit
36: Storage unit
37: Lamp control unit
38: Power source fan control unit
39: Power source fan

The invention claimed is:

1. A projection display device that projects light modulated based on a video signal, comprising:
   a light source;
   a first fan for cooling the light source;
   a second fan different from the first fan; and
   a third fan different from the first fan and the second fan, wherein:
   a number of revolutions of the first fan is increased or decreased with an increase or decrease of an output of the light source;
   a number of revolutions of the third fan is decreased when the number of revolutions of the first fan is increased, and increased when the number of revolutions of the first fan is decreased; and
   a number of revolutions of the second fan is always maintained constant.

2. The projection display device according to claim 1, wherein:
   the second fan discharges air out of a case; and
   the third fan cools a power source unit.

3. The projection display device according to claim 2, wherein the first fan comprises a sirocco fan, and the third fan comprises a sirocco fan similar in shape and size to the first fan.

4. The projection display device according to claim 1, further comprising a dimming level calculation unit that calculates a dimming level of the light source based on the video signal,
   wherein the output of the light source is increased or decreased based on the dimming level calculated by the dimming level calculation unit.

5. The projection display device according to claim 4, further comprising:
   a storage unit that stores data relating to a relationship among a plurality of dimming levels calculated by the dimming level calculation unit, the output of the light source, the number of revolutions of the first fan, and the number of revolutions of the second fan;
   a light source control unit that controls the output of the light source based on said data;
   a first fan control unit that controls the number of revolutions of the first fan based on said data; and
   a second fan control unit that controls the number of revolutions of the second fan based on said data.

6. The projection display device according to claim 5, further comprising a third control unit that controls the number of revolutions of the third fan based on said data stored by the storage unit.

7. The projection display device according to claim 6, wherein the first fan comprises a sirocco fan, and the third fan comprises a sirocco fan similar in shape and size to the first fan.

8. The projection display device according to claim 5, wherein the first fan comprises a sirocco fan, and the third fan comprises a sirocco fan similar in shape and size to the first fan.

9. The projection display device according to claim 4, wherein the first fan comprises a sirocco fan, and the third fan comprises a sirocco fan similar in shape and size to the first fan.

10. The projection display device according to claim 1, wherein the first fan comprises a sirocco fan, and the third fan comprises a sirocco fan similar in shape and size to the first fan.

11. The projection display device according to claim 1, wherein the first fan comprises a sirocco fan, and the second fan comprises an axial fan.

12. A projection display device that projects light modulated based on a video signal, comprising:
- a light source;
- a first fan for cooling the light source;
- a second fan different from the first fan; and
- a third fan different from the first fan and the second fan, wherein:
- a number of revolutions of the first fan is increased or decreased with an increase or decrease of an output of the light source; and
- a number of revolutions of the second fan and a number of revolutions of the third fan are decreased when the number of revolutions of the first fan is increased, and increased when the number of revolutions of the first fan is decreased.

13. The projection display device according to claim 12, wherein:
- the second fan discharges air out of a case; and
- the third fan cools a power source unit.

14. The projection display device according to claim 12, further comprising a dimming level calculation unit that calculates a dimming level of the light source based on the video signal,
wherein the output of the light source is increased or decreased based on the dimming level calculated by the dimming level calculation unit.

15. The projection display device according to claim 12, wherein the first fan comprises a sirocco fan, and the second fan comprises an axial fan.

16. The projection display device according to claim 12, wherein the first fan comprises a sirocco fan, and the third fan comprises a sirocco fan similar in shape and size to the first fan.

* * * * *